(12) United States Patent
Elwasila et al.

(10) Patent No.: US 9,951,693 B2
(45) Date of Patent: Apr. 24, 2018

(54) FUEL SUPPLY SYSTEM FOR A GAS TURBINE COMBUSTOR

(71) Applicant: General Electric Company, Schenectady, NY (US)

(72) Inventors: Nazar Ahmed Elwasila, Simpsonville, SC (US); Robert Joseph Rohrssen, Greenville, SC (US); Ronnie Ray Pentecost, Travelers Rest, SC (US); Lucas John Stoia, Taylors, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 299 days.

(21) Appl. No.: 14/629,717

(22) Filed: Feb. 24, 2015

(65) Prior Publication Data

US 2016/0245182 A1 Aug. 25, 2016

(51) Int. Cl.
  *F02C 7/22* (2006.01)
  *F23R 3/28* (2006.01)
  *F23R 3/34* (2006.01)
  *F02C 7/228* (2006.01)

(52) U.S. Cl.
  CPC .............. *F02C 7/222* (2013.01); *F02C 7/22* (2013.01); *F02C 7/228* (2013.01); *F23R 3/28* (2013.01); *F23R 3/34* (2013.01); *F23R 3/346* (2013.01)

(58) Field of Classification Search
  None
  See application file for complete search history.

(56) References Cited

U.S. PATENT DOCUMENTS

| 5,177,955 A | 1/1993 | Shekleton |
| 5,390,498 A * | 2/1995 | Sulkin ............... F02C 7/222 60/739 |
| 5,771,696 A * | 6/1998 | Hansel ............... F23D 23/00 60/739 |
| 8,745,987 B2 | 6/2014 | Stoia et al. |

(Continued)

FOREIGN PATENT DOCUMENTS

WO 2015/023863 A1 2/2015

OTHER PUBLICATIONS

Extended European Search Report and Opinion issued in connection with corresponding EP Application No. 6156813.4 dated Oct. 4, 2016.

*Primary Examiner* — Pascal M Bui Pho
*Assistant Examiner* — Kyle Thomas
(74) *Attorney, Agent, or Firm* — Dority & Manning, PA

(57) ABSTRACT

A fuel supply system for a gas turbine combustor includes a fuel distribution manifold. A first fuel circuit extends from the fuel distribution manifold in a first circumferential direction around an outer surface of the outer casing and provides for fluid communication from the fuel distribution manifold, through the outer casing and to at least one fuel injector disposed within the outer casing. A second fuel circuit extends from the fuel distribution manifold in a second circumferential direction around the outer surface of the outer casing. The second fuel circuit provides for fluid communication from the fuel distribution manifold, through the outer casing and to at least one fuel injector within the outer casing. In particular configurations, the fuel supply system includes a shield that surrounds at least a portion of the outer casing and at least partially encases the first fuel circuit and the second fuel circuit.

17 Claims, 4 Drawing Sheets

(56) References Cited

U.S. PATENT DOCUMENTS

| | | |
|---|---|---|
| 2002/0069647 A1 | 6/2002 | Mayersky et al. |
| 2010/0018210 A1 | 1/2010 | Fox et al. |
| 2010/0071377 A1* | 3/2010 | Fox .................... F23R 3/16 60/740 |
| 2011/0056206 A1* | 3/2011 | Wiebe ................ F23D 11/36 60/740 |
| 2011/0067402 A1* | 3/2011 | Wiebe ................ F23R 3/08 60/740 |
| 2011/0203284 A1 | 8/2011 | Ritland et al. |
| 2014/0260277 A1 | 9/2014 | DiCintio et al. |

* cited by examiner

FUEL SUPPLY SYSTEM FOR A GAS TURBINE COMBUSTOR

FIELD OF THE INVENTION

The present invention generally involves a combustor for a gas turbine. More specifically, the invention relates to a fuel supply system for providing fuel to a fuel injector disposed downstream from a primary combustion zone defined within the combustor.

BACKGROUND OF THE INVENTION

A gas turbine generally includes a compressor section, a combustion section having a combustor and a turbine section. The compressor section progressively increases the pressure of a working fluid to supply a compressed working fluid to the combustion section. The compressed working fluid is routed through and/or around a fuel nozzle that extends axially within the combustor. A fuel is injected into the flow of the compressed working fluid to form a combustible mixture.

The combustible mixture is burned within a combustion zone to generate combustion gases having a high temperature, pressure and velocity. The combustion gases flow through one or more liners or ducts that define a hot gas path into the turbine section. Kinetic energy is extracted from the combustion gases via turbine rotor blades coupled to a rotor shaft, thus causing the rotor shaft to rotate. The rotor shaft may support operation of the compressor and/or may be coupled to a generator to produce electricity.

In order to balance overall emissions performance, certain combustor designs include multiple fuel injectors that are arranged around the liner and positioned generally downstream from the combustion zone. The fuel injectors generally extend radially through the liner to provide for fluid communication into the combustion gas flow field. This type of system is commonly known in the art and/or the gas turbine industry as Late Lean Injection (LLI) and/or as axial fuel staging.

In operation, a portion of the compressed working fluid is routed through and/or around each of the fuel injectors and into the combustion gas flow field. A liquid or gaseous fuel from the fuel injectors is injected into the flow of the compressed working fluid to provide a lean or air-rich combustible mixture which combusts as it mixes with the hot combustion gases, thereby increasing the firing temperature of the combustor without producing a corresponding increase in the residence time of the combustion gases inside the combustion zone. As a result, the overall thermodynamic efficiency of the combustor may be increased without sacrificing overall emissions performance.

Current systems for providing fuel from an external fuel source to the late lean fuel injectors comprise numerous fluid conduits and fluid couplings that extend within a casing that surrounds the combustor. As a result, designers must account for the additional space required within the casing to accommodate the required hardware. This may affect the overall size of the combustor and/or may negatively impact fluid flow profiles within the combustor. Therefore, an improved system for providing fuel to the combustor, particularly to the late lean fuel injectors would be useful.

BRIEF DESCRIPTION OF THE INVENTION

Aspects and advantages of the invention are set forth below in the following description, or may be obvious from the description, or may be learned through practice of the invention.

One embodiment of the present invention is a fuel supply system for a gas turbine combustor. The system includes a fuel distribution manifold that is coupled to an outer casing of the combustor. A first fuel circuit extends from the fuel distribution manifold in a first circumferential direction around an outer surface of the outer casing and provides for fluid communication from the fuel distribution manifold, through the outer casing and to at least one fuel injector of a plurality of fuel injectors that are disposed within the outer casing. A second fuel circuit extends from the fuel distribution manifold in a second circumferential direction around the outer surface of the outer casing. The second fuel circuit provides for fluid communication from the fuel distribution manifold, through the outer casing and to at least one fuel injector of the plurality of fuel injectors.

Another embodiment of the present invention is a combustor for a gas turbine. The combustor includes an outer casing and an end cover that are coupled to the outer casing. A primary fuel nozzle extends axially downstream from the end cover within the outer casing. A primary combustion zone is defined downstream from the primary fuel nozzle. A plurality of fuel injectors is disposed within the outer casing downstream from the primary combustion zone. A fuel distribution manifold is coupled to the outer casing of the combustor. A first fuel circuit extends from the fuel distribution manifold in a first circumferential direction around an outer surface of the outer casing. The first fuel circuit provides for fluid communication from the fuel distribution manifold, through the outer casing and to one fuel injector of the plurality of fuel injectors. A second fuel circuit extends from the fuel distribution manifold in a second circumferential direction around the outer surface of the outer casing. The second fuel circuit provides for fluid communication from the fuel distribution manifold, through the outer casing and to one fuel injector of the plurality of fuel injectors.

The present invention also includes a gas turbine. The gas turbine includes a compressor and a combustor disposed downstream from the compressor. The combustor has an outer casing and an end cover that is coupled to the outer casing and a fuel nozzle that extends axially downstream from the end cover within the outer casing. The gas turbine further includes a fuel supply that is in fluid communication with the combustor and a turbine that is disposed downstream from the combustor. The combustor further comprises a plurality of fuel injectors that is disposed within the outer casing downstream from the fuel nozzle. A fuel distribution manifold is coupled to the outer casing of the combustor and is in fluid communication with the fuel supply. A first fuel circuit extends from the fuel distribution manifold in a first circumferential direction around an outer surface of the outer casing and provides for fluid communication from the fuel distribution manifold, through the outer casing and to one fuel injector of the plurality of fuel injectors. A second fuel circuit extends from the fuel distribution manifold in a second circumferential direction around the outer surface of the outer casing and provides for fluid communication from the fuel distribution manifold, through the outer casing and to one fuel injector of the plurality of fuel injectors.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
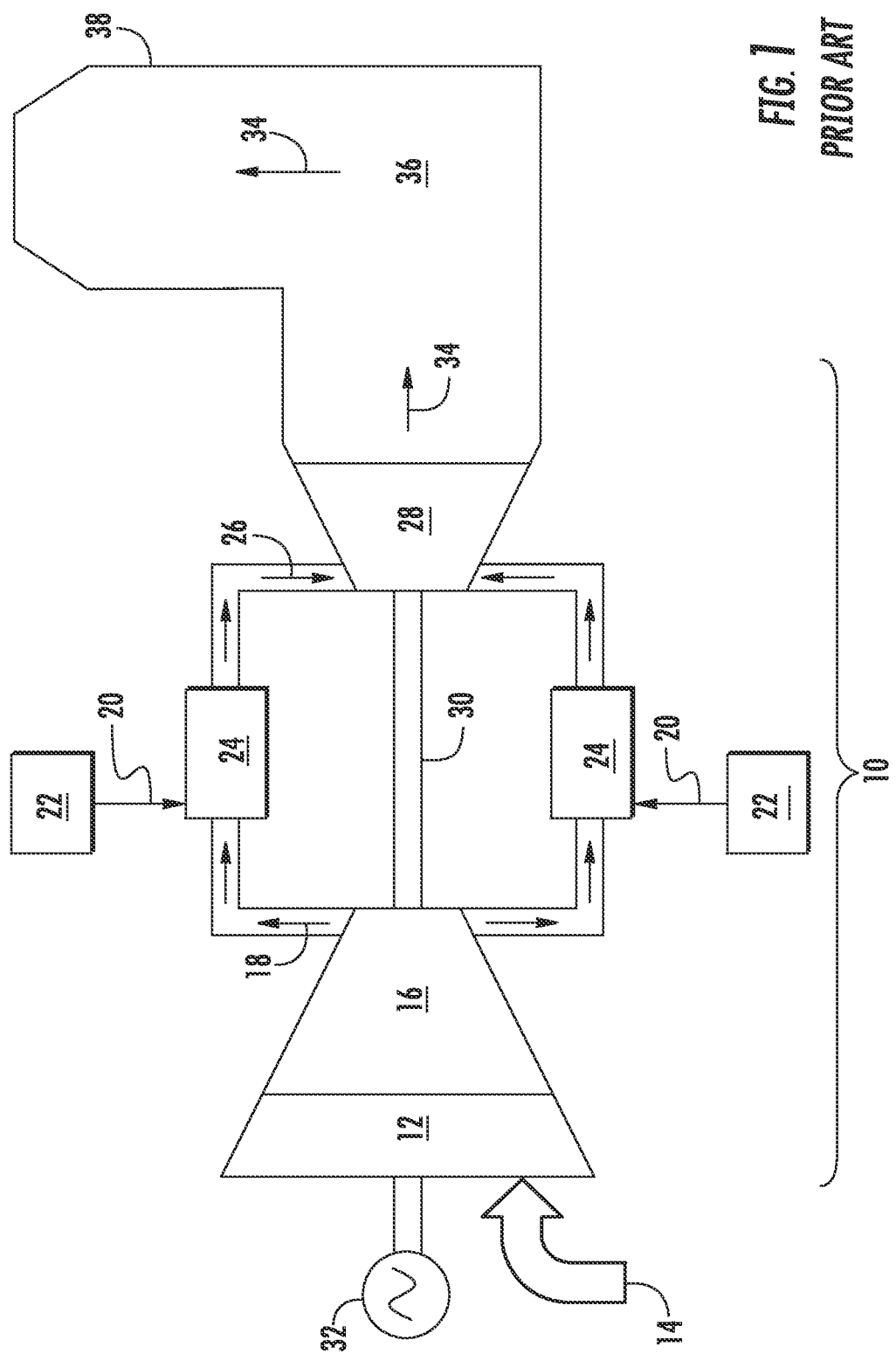
FIG. 1 is a functional block diagram of an exemplary gas turbine within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a combustor incorporated into a land based or industrial gas turbine for purposes of illustration, one of ordinary skill in the art will readily appreciate that embodiments of the present invention may be applied to any combustor incorporated into any turbomachine and is not limited to a land based or industrial gas turbine combustor unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a fuel 20 from a fuel supply system 22 to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
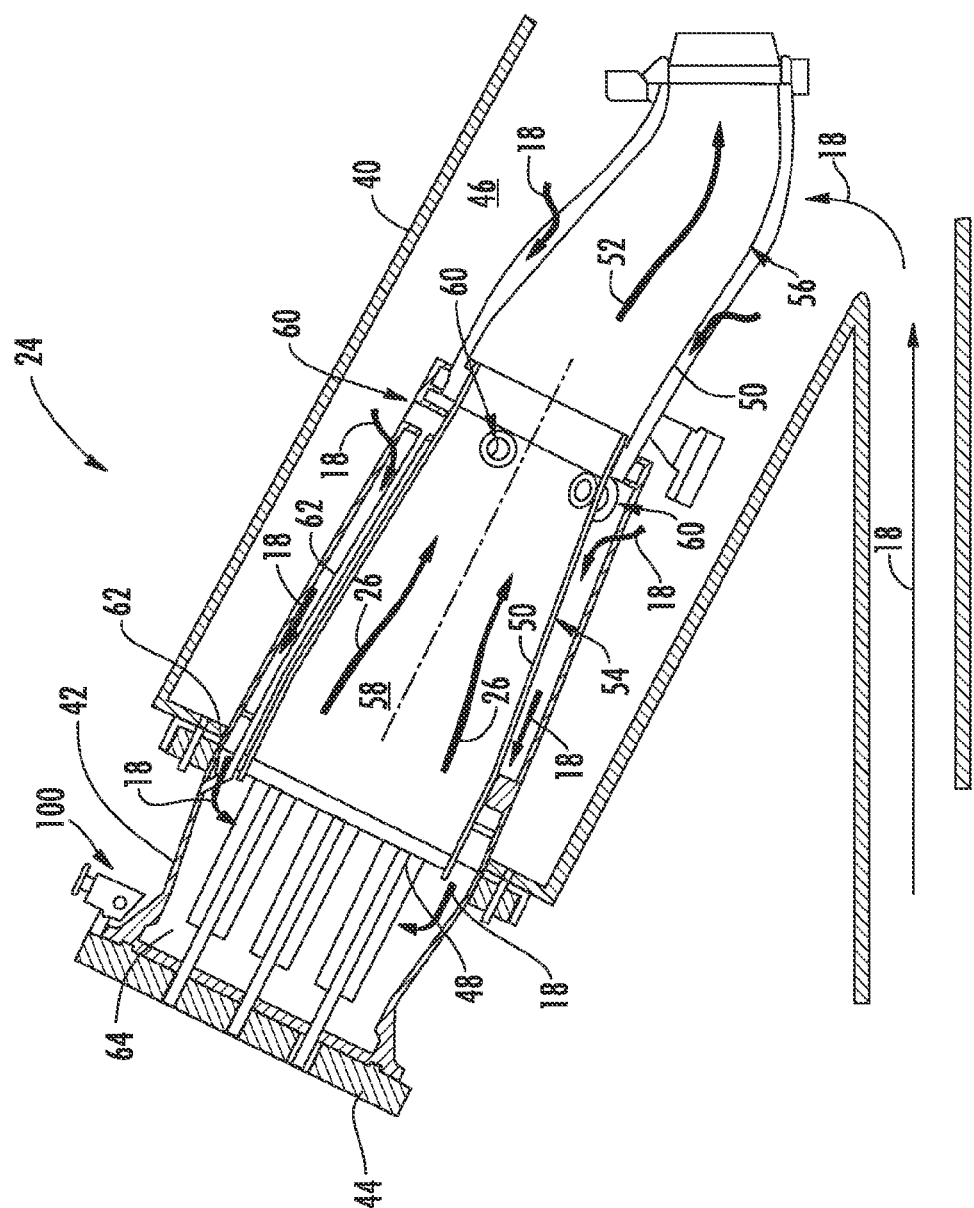
FIG. 2 is a cross-section side view of a portion of an exemplary can type combustor as may be incorporate various embodiments of the present invention.

The combustor 24 may be any type of combustor known in the art, and the present invention is not limited to any particular combustor design unless specifically recited in the claims. For example, the combustor 24 may be a can type or a can-annular type of combustor. FIG. 2 provides a cross-section side view of a portion of an exemplary gas turbine 10 including a portion of the combustor 24. As shown in FIG. 2, an outer casing 40 surrounds at least a portion of the combustor 24. In particular embodiments, an annular forward casing 42 is coupled to the outer casing 40. An end cover 44 is coupled to the forward casing 42 at one end of the combustor 24. The end cover 44, the forward casing 42 and the outer casing 40 generally define a high pressure plenum 46 that surrounds the combustor 24. The high pressure plenum 46 is in fluid communication with the compressor 16 and receives the compressed working fluid 18 therefrom.

At least one primary fuel nozzle 48 extends axially downstream from the end cover 44 within the forward casing 42. A liner 50 extends downstream from the primary fuel nozzle 48 within the outer casing 40. The liner 50 is generally annular and extends at least partially through the high pressure plenum 46 so as to at least partially define a hot gas path 52 within the combustor 24 for routing the combustion gases 26 through the high pressure plenum 46 towards the turbine 28 (FIG. 1).

The liner 50 may be a singular liner or may be divided into separate components. For example, as illustrated in FIG. 2, the liner 50 may comprise of a combustion liner 54 that is disposed proximate to the primary fuel nozzle 48 and a transition duct 56 that extends downstream from the combustion liner 54. The combustion liner 54 and/or the transition duct 56 may be shaped so as to accelerate the flow of the combustion gases 26 through the hot gas path 52 upstream from a stage of stationary nozzles (not shown) that are disposed proximate to an inlet of the turbine 28 (FIG. 1). A primary combustion zone 58 is defined downstream from the primary fuel nozzle(s) 48. The primary combustion zone 58 may be at least partially defined by the liner 50.

A plurality of fuel injectors 60, also known as late lean injectors (LLIs), are arranged or spaced circumferentially around the liner 50 and extend at least partially through the liner 50. The fuel injectors 60 provide for fluid communication through the liner 50 into the hot gas path 52 at a position that is downstream from the fuel nozzle(s) 48 and/or downstream from the primary combustion zone 58. The fuel injectors 60 are in fluid communication with a fuel supply via tubes 62 and/or fittings (not shown). In particular configurations, the tubes 62 may extend along the liner 50 towards a head end portion 64 of the combustor 24.

Figure 3:
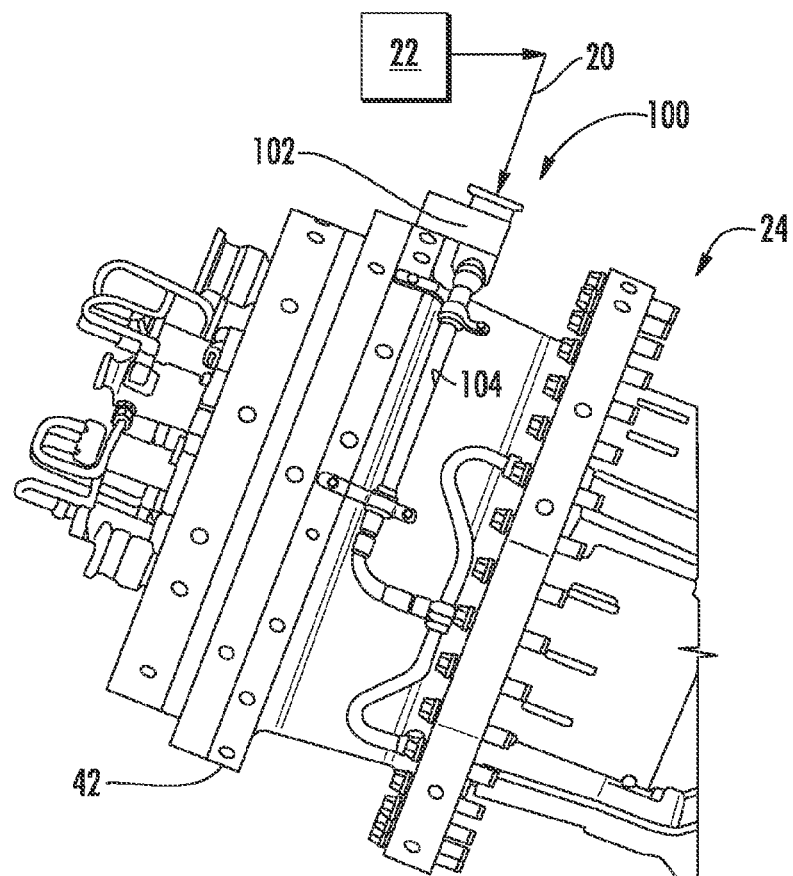
FIG. 3 is a side view of a portion of the combustor as shown in FIG. 2, including a fuel supply system for providing fuel to the combustor according to various embodiments of the present invention.
Figure 4:
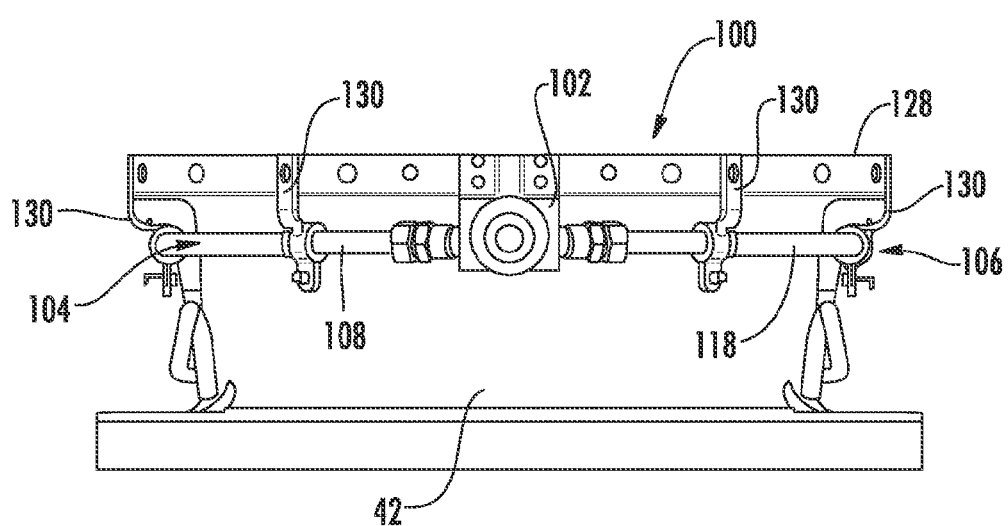
FIG. 4 provides a top view of a portion of the fuel supply system as shown in FIG. 3, according to various embodiments of the present invention.
Figure 5:
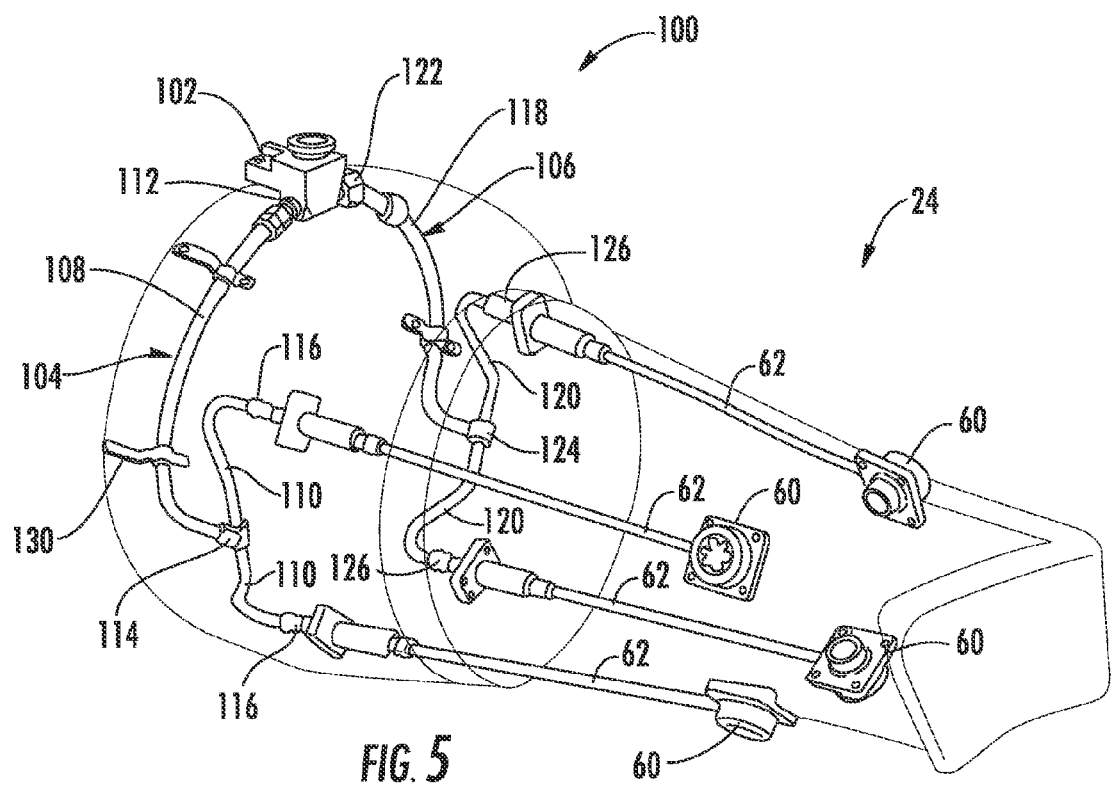
FIG. 5 provides a perspective view of the fuel supply system as shown in FIG. 3, according to one embodiment of the present invention.
Figure 6:
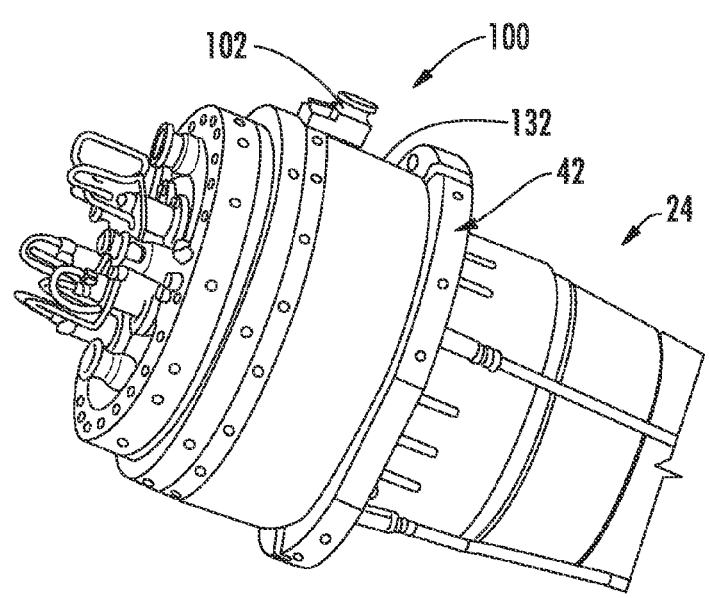
FIG. 6 provides a perspective side view of a portion of the combustor including the fuel supply system as shown in FIG. 3, according to one embodiment of the present invention.

In various embodiments, fuel is supplied to the fuel injectors 60 via a fuel supply system 100. FIG. 3 provides a side view of a portion of the combustor 24 including the fuel supply system 100 herein referred to as "system" according to various embodiments of the present invention. FIG. 4 provides a top view of the system 100 as shown in FIG. 3. FIG. 5 provides a perspective view of the system 100 as shown in FIG. 3. FIG. 6 provides a perspective side view of a portion of the combustor 24 including the fuel supply system 100 according to one embodiment of the present invention.

As shown collectively in FIGS. 3-6, the system 100 includes a fuel distribution manifold 102, a first fuel circuit 104 (FIGS. 3, 4 and 5) that extends from the fuel distribution manifold 102 in a first circumferential direction around an outer surface of the forward casing 42 and a second fuel circuit 106 (FIGS. 4 and 5) that extends from the fuel distribution manifold 102 in an opposing or second circumferential direction around the outer surface of the forward casing 42. The fuel distribution manifold 102 is in fluid communication with the fuel supply 22. The first fuel circuit 104 and the second fuel circuit 106 are each in fluid communication with the fuel distribution manifold 102 and with corresponding fuel injectors 60 of the plurality of fuel injectors 60. The system 100 may be configured to provide a gaseous or a liquid fuel.

Each of the first and second fuel circuits 104, 106 include various tubes and fittings. In particular embodiments, as shown in FIG. 5, the first fuel circuit 104 includes a primary fuel line 108 and one or more secondary fuel lines 110. The primary fuel line 108 is in fluid communication with a first outlet 112 of the fuel distribution manifold 102 and at least one flow splitter 114. Each of the secondary fuel lines 110 provides for fluid communication from the flow splitter 114 to one or more fuel injectors 60. The secondary fuel lines 110 may be fluidly coupled to the fuel injectors 60 via fittings 116 that provide for fluid communication through the forward casing 42. The flow splitter 114 may be a T-type flow splitter (one inlet and two outlets) or may include any number of outlets to feed multiple fuel injectors 60. Although only one flow splitter is shown, the first fuel circuit 104 may include any number of flow splitters as required to feed any number of the fuel injectors 60.

In particular embodiments, as shown in FIG. 5, the second fuel circuit 106 includes a primary fuel line 118 and one or more secondary fuel lines 120. The primary fuel line 118 is in fluid communication with a second outlet 122 of the fuel distribution manifold 102 and at least one flow splitter 124. Each of the secondary fuel lines 120 provides for fluid communication from the flow splitter 124 to one or more fuel injectors 60. The secondary fuel lines 120 may be fluidly coupled to the fuel injectors 60 via fittings 126 that provide for fluid communication through the forward casing 42. The flow splitter 124 may be a T-type flow splitter (one inlet and two outlets) or may include any number of outlets to feed multiple fuel injectors 60. Although only one flow splitter is shown, the second fuel circuit 106 may include any number of flow splitters as required to feed any number of the fuel injectors 60.

Referring back to FIG. 4, in particular embodiments, the fuel distribution manifold 102 and/or the primary fuel lines 108, 118 may be coupled or fixedly connected to the forward casing 42. For example, the fuel distribution manifold 102 and/or the primary fuel lines 108, 118 may be coupled or fixedly connected to a flange portion 128 of the forward casing 42 via brackets 130.

In particular embodiments, as shown in FIG. 6, a shield 132 extends circumferentially around at least a portion of the forward casing 42 so as to cover or shield the primary fuel lines 108, 118 (FIG. 5) and the secondary fuel lines 110, 120 (FIG. 5). A plenum 134 may be defined between the forward casing 42 and the shield 132. The shield 132 generally protects the various components of first and second fuel circuits 104, 106 from inadvertent damage, while providing access for inspection, repair and/or assembly of the system 100. In addition the shield 132 may retain thermal energy from the forward casing within the plenum 134, thus providing thermal energy to the fuel flowing through the first and second fuel circuits 104, 106.

During operation, fuel 22 is supplied to the fuel distribution manifold 102. The fuel 20 is routed via outlets 112, 122 out of the fuel distribution manifold 102 and into the primary fuel lines 108, 118. The fuel 20 is then split via splitters 114, 124 into the various secondary fuel lines 110, 120 where it flows through the forward casing 42 and into the outer casing 40 via fittings 116, 126. The fuel is then routed to the fuel injectors 60 via tubes 62 which extend within the outer casing 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A fuel supply system for a gas turbine combustor, the system comprising:
   an outer casing;
   a liner positioned within the outer casing;
   a forward casing positioned axially upstream of the outer casing such that the forward casing is positioned outside of the outer casing, the outer casing and the forward casing at least partially defining a first plenum within the outer casing and the forward casing;
   a fuel distribution manifold coupled to the outer casing;
   a first fuel circuit that extends from the fuel distribution manifold in a first circumferential direction around an outer surface of the forward casing and an outer surface of the outer casing, wherein the first fuel circuit provides for fluid communication from the fuel distribution manifold, through the outer casing and to at least one fuel injector of a plurality of fuel injectors that are disposed within the outer casing; and
   a second fuel circuit that extends from the fuel distribution manifold in a second circumferential direction around the outer surface of the forward casing and the outer surface of the outer casing, wherein the second fuel circuit provides for fluid communication from the fuel distribution manifold, through the outer casing and to at least one other fuel injector of the plurality of fuel injectors; and a shield that circumferentially surrounds at least a portion of the forward casing, the shield at least partially encasing the first fuel circuit and the second fuel circuit, wherein the shield is disposed outside of the first plenum.

2. The system as in claim 1, wherein the shield at least partially defines a second plenum between the forward casing and the shield, wherein the first and second fuel circuits extend within the second plenum.

3. The system as in claim 1, wherein the first fuel circuit includes a primary fuel line that is in fluid communication with the fuel distribution manifold and a plurality of secondary fuel lines, wherein each secondary fuel line of the plurality of secondary fuel lines is in fluid communication with the primary fuel line and the at least one fuel injector of the plurality of fuel injectors.

4. The system as in claim 3, further comprising fittings fluidly connected to the plurality of secondary fuel lines of the first fuel circuit, wherein the fittings provide for fluid communication through the outer casing.

5. The system as in claim 1, wherein the second fuel circuit includes a primary fuel line that is in fluid communication with the fuel distribution manifold and a plurality of secondary fuel lines, wherein each secondary fuel line of the plurality of secondary fuel lines is in fluid communication with the primary fuel line and the at least one other fuel injector of the plurality of fuel injectors.

6. The system as in claim 5, further comprising fittings fluidly connected to the plurality of secondary fuel lines of the second fuel circuit, wherein the fittings provide for fluid communication through the outer casing.

7. The system as in claim 1, wherein the forward casing surrounds at least a portion of the gas turbine combustor.

8. A combustor for a gas turbine, the combustor comprising:
an outer casing;
a liner positioned within the outer casing;
a forward casing coupled to the outer casing, the forward casing being positioned axially upstream of the outer casing such that the forward casing is positioned outside of the outer casing;
an end cover coupled to the forward casing, wherein the outer casing, the forward casing, and the end cover at least partially define a first plenum with the outer casing and the forward casing;
a primary fuel nozzle that extends axially downstream from the end cover within the forward casing and the outer casing;
a primary combustion zone defined downstream from the primary fuel nozzle;
a plurality of fuel injectors disposed within the outer casing downstream from the primary combustion zone;
a fuel distribution manifold coupled to the forward casing;
a first fuel circuit that extends from the fuel distribution manifold in a first circumferential direction around an outer surface of the forward casing and an outer surface of the outer casing, wherein the first fuel circuit provides for fluid communication from the fuel distribution manifold, through the outer casing and to at east one fuel injector of the plurality of fuel injectors;
a second fuel circuit that extends from the fuel distribution manifold in a second circumferential direction around the outer surface of the forward casing and the outer surface of the outer casing, wherein the second fuel circuit provides for fluid communication from the fuel distribution manifold, through the outer casing and to at east one other fuel injector of the plurality of fuel injectors; and a shield that circumferentially surrounds at least a portion of the forward casing, the shield at least partially encasing the first fuel circuit and the second fuel circuit, wherein the shield is disposed outside of the first plenum.

9. The combustor as in claim 8, wherein the shield at least partially defines a second plenum between the forward casing and the shield, wherein the first and second fuel circuits extend within the second plenum.

10. The combustor as in claim 8, wherein the first fuel circuit includes a primary fuel line that is in fluid communication with the fuel distribution manifold and a plurality of secondary fuel lines, wherein each secondary fuel line of the plurality of secondary fuel lines is in fluid communication with the primary fuel line and the at least one fuel injector of the plurality of fuel injectors.

11. The combustor as in claim 10, further comprising fittings fluidly connected to the secondary fuel lines, wherein the fittings provide for fluid communication through the outer casing.

12. The combustor as in claim 8, wherein the second fuel circuit includes a primary fuel line that is in fluid communication with the fuel distribution manifold and a plurality of secondary fuel lines, wherein each secondary fuel line of the plurality of secondary fuel lines is in fluid communication with the primary fuel line and the at least one other fuel injector of the plurality of fuel injectors.

13. The combustor as in claim 12, further comprising fittings fluidly connected to the secondary fuel lines, wherein the fittings provide for fluid communication through the outer casing.

14. The combustor as in claim 8, wherein the forward casing surrounds at least a portion of the combustor.

15. A gas turbine, comprising:
a compressor;
a turbine; and
a combustor disposed downstream from the compressor and upstream of the turbine, the combustor comprising:
an outer casing;
a liner positioned within the outer casing;
a forward casing coupled to the outer casing, the forward casing being positioned axially upstream of the outer casing such that the forward casing is positioned outside of the outer casing;
an end cover coupled to the forward casing, wherein the outer casing, the forward casing, and the end cover at least partially define a first plenum with the outer casing and the forward casing;
a fuel nozzle that extends axially downstream from the end cover within the forward casing and the outer casing;
a fuel supply in fluid communication with the combustor;
a plurality of fuel injectors disposed within the outer casing downstream from the fuel nozzle;
a fuel distribution manifold coupled to the forward casing of the combustor, wherein the fuel distribution manifold is in fluid communication with the fuel supply;
a first fuel circuit that extends from the fuel distribution manifold in a first circumferential direction around an outer surface of the forward casing and an outer surface of the outer casing, wherein the first fuel circuit provides for fluid communication from the fuel distribution manifold, through the outer casing and to at east one fuel injector of the plurality of fuel injectors;

a second fuel circuit that extends from the fuel distribution manifold in a second circumferential direction around the outer surface of the forward casing and the outer surface of the outer casing, wherein the second fuel circuit provides for fluid communication from the fuel distribution manifold, through the outer casing and to at least one other fuel injector of the plurality of fuel injectors; and a shield that circumferentially surrounds at least a portion of the forward casing, the shield at least partially encasing the first fuel circuit and the second fuel circuit, wherein the shield is disposed outside of the first plenum.

16. The gas turbine as in claim 15, wherein the shield at least partially defines a second plenum between the forward casing and the shield, wherein the first and second fuel circuits extend within the second plenum.

17. The gas turbine as in claim 15, wherein the first fuel circuit includes a primary fuel line that is in fluid communication with the fuel distribution manifold and a plurality of secondary fuel lines, wherein each secondary fuel line of the plurality of secondary fuel lines of the first fuel circuit is in fluid communication with the primary fuel line of the first fuel circuit and the at least one fuel injector of the plurality of fuel injectors, and wherein the second fuel circuit includes a primary fuel line that is in fluid communication with the fuel distribution manifold and a plurality of secondary fuel lines, wherein each secondary fuel line of the plurality of secondary fuel lines of the second fuel circuit is in fluid communication with the primary fuel line of the second fuel circuit and the at least one other fuel injector of the plurality of fuel injectors.

* * * * *